US006978453B2

(12) United States Patent
Rao et al.

(10) Patent No.: US 6,978,453 B2
(45) Date of Patent: Dec. 20, 2005

(54) SYSTEM WITH REQUIRED ENHANCEMENTS TO SYNCML DM ENVIRONMENT TO SUPPORT FIRMWARE UPDATES

(75) Inventors: Bindu Rama Rao, Laguna Niguel, CA (US); Patrick C. Lilley, Irvine, CA (US)

(73) Assignee: Bitfone Corporation, Laguna Niguel, CA (US)

( * ) Notice: Subject to any disclaimer, the term of this patent is extended or adjusted under 35 U.S.C. 154(b) by 56 days.

(21) Appl. No.: 10/689,309

(22) Filed: Oct. 20, 2003

(65) Prior Publication Data

US 2004/0083472 A1 Apr. 29, 2004

Related U.S. Application Data

(60) Provisional application No. 60/419,903, filed on Oct. 21, 2002.

(51) Int. Cl.[7] .................................................. G06F 9/44
(52) U.S. Cl. ....................... 717/171; 717/114; 717/139
(58) Field of Search ................................ 717/171, 114

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |

(Continued)

FOREIGN PATENT DOCUMENTS

CA 2339923 3/2000

(Continued)

OTHER PUBLICATIONS

P. Ciancarini et al, "Using a Coordination Language to Specify and Analyze Systems Containing Modile Components", ACM Transactions, vol. 9, No. 2 Apr. 2000, pp. 167-198.*

(Continued)

*Primary Examiner*—Todd Ingberg
(74) *Attorney, Agent, or Firm*—McAndrews, Held & Malloy, Ltd.

(57) ABSTRACT

A system for employing SyncML DM for updating firmware in mobile handsets and other devices. The system employs enhancements to SyncML DM specifications. A SyncML management client employs new commands, specified by the present invention, for retrieving update packages for firmware updates, for the verification of a received update package, the command for saving the update package in an appropriate management object, the command for initiating an update process by an update agent and the command for the subsequent notification of the results of processing by the update agent (success, failure, etc.). More specifically, the SyncML DM management client employs new commands, specified by the present invention, for retrieving update packages for firmware updates and for updating the firmware selectively based on appropriateness, security and authentication, employing fault tolerant means.

26 Claims, 2 Drawing Sheets

U.S. PATENT DOCUMENTS

| | | | | |
|---|---|---|---|---|
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,167,567 | A * | 12/2000 | Chiles et al. | 717/173 |
| 6,198,946 | B1 | 3/2001 | Shin et al. | 455/561 |
| H001964 | H * | 6/2001 | Hoffpauir et al. | 370/419 |
| 6,266,809 | B1 * | 7/2001 | Craig et al. | 717/173 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,587,685 | B2 * | 7/2003 | Mittal et al. | 455/419 |
| 2001/0029178 | A1 | 10/2001 | Criss et al. | 455/419 |
| 2001/0047363 | A1 | 11/2001 | Peng | 707/104.1 |
| 2001/0048723 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

Mobile Streaming Media CDN Enabled by Dynamic SMIL, Takeshi Yoshimura et al, ACM, May 2002, pp. 651-661.*

* cited by examiner

SYSTEM WITH REQUIRED ENHANCEMENTS TO SYNCML DM ENVIRONMENT TO SUPPORT FIRMWARE UPDATES

RELATED APPLICATIONS

This patent application makes reference to, claims priority to and claims benefit from U.S. Provisional Patent Application Ser. No. 60/419,903, entitled "System with Required Enhancements to SyncML DM Environment to Support Firmware Updates," filed on Oct. 21, 2002.

The complete subject matter of the above-referenced United States Patent Application is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates generally to the generation and dissemination of update packages for software and/or firmware employing the Synchronization Markup Language (SyncML) device management (DM) specifications and, more specifically, to the enhancements to SyncML DM in terms of new commands that facilitate firmware updates from one version to another.

BACKGROUND OF THE INVENTION

Electronic devices, such as mobile phones and personal digital assistants (PDAs), often contain firmware and application software either provided by the manufacturer of the electronic devices, by telecommunication carriers, or by third parties. The firmware and application software often contain software bugs. New versions of the firmware and software are periodically released to fix the bugs or to introduce new features, or both.

SyncML, founded in February 2000, is an open industry standard for a common data synchronization protocol that facilitates the transport of network data and personal information across multiple networks, platforms and devices. Ericsson, IBM, Lotus, Matsushita, Motorola, Nokia, Starfish Software, Symbian, and Openwave sponsor the SyncML standard.

The SyncML standard was originally created to enable end users to seamlessly synchronize any type or format of network data with any mobile device. Since the creation of the data synchronization specification, the standards body has also developed the DM specification, which leverages the original specification. The two specifications are designed to be independent of the mobile device, network, and applications. For this purpose SyncML utilizes Extensible Markup Language (XML) technology.

The first specification to evolve from the SyncML initiative was centered on synchronization of networked information to a mobile device. The goal of the common synchronization protocol was to solve the problem of multiple proprietary data synchronization protocols that limited the use and availability of data. The data synchronization specification enables any networked data to work with any mobile device. For example, an end user could access personal information, such as an address book, from a handheld or PDA and the data would be accessible and current.

Synchronization has different semantics when applied to firmware updates. For example, generic synchronization attempts to make an instance of data that looks like X into an instance of data that looks like X' (X-prime), and vice versa, without regard to the availability of various other versions of the same data, such as X" (X-prime-prime), etc. Firmware updates, in general, require the specification of what the target version should be.

In addition, firmware updates differ from synchronization in that the carrier-side or server-side does not have an entity that is a firmware—it only contains data that may be generated/translated into a firmware.

The second specification from the SyncML initiative revolves around the remote management of mobile devices, or device management (DM). Device management is the generic term used for technology that allows third parties to carry out the procedures of configuring mobile devices on behalf of the end user. SyncML defines device management as a technology that enables customization, personalization, and servicing of personal devices.

The DM specification proposes that future releases will facilitate software distribution, parameter configuration, and device capability verification. According to the SyncML White Paper, the planned device management scope includes device configuration (e.g. modifying or reading operating parameters), software maintenance (e.g. reading from a device its current operating parameters, reading a list installed or running software, hardware configurations), and diagnostics (e.g. listening for alerts sent from a device, invoking local diagnostics on a device).

The initial specification for the device management standard was released in February 2002. That release describes, from a high level, the protocol, component description, management frameworks, and security involved with the device management process. The DM specification has alluded to the fact that one of the future features would be the capability to download software. Details of the "software download" process were not included in the latest specification, but the download specification is projected to be completed in 2003. The standard does not specify formats of or methods to create update packages (encoded information of modifications to firmware/software necessary for upgrading to a new or modified version of the firmware/software) or how to apply the updates within the device. It mainly deals with management of the meta-data and the process around it. As with the aforementioned data synchronization protocol, the DM protocol will be open, and network and device agnostic.

SyncML has been promoted by the wireless industry as a solution for data transfers between mobile handsets and service providers. Although flexible, the current SyncML DM specifications do not yet provide support for firmware updates.

There is a fundamental problem in supporting firmware updates employing SyncML DM-based software. There is no support in SyncML DM for firmware updates, as there are no commands or request structure that support setting of firmware version change indicators, power cycling, authentication/verification of software packages or firmware updates received, etc. In addition, the ability to request a software/firmware update in terms of source and target versions is essential but not currently supported in SyncML DM. Specifically, the semantics of retrieving a firmware update from a server on a carrier network is different from that of acquiring/retrieving generic data or content from a web site, and SyncML DM does not currently support these special semantics.

There is a fundamental asymmetry introduced into the client and server-sides of any SyncML-based solutions. Any "power cycling" command (needed to reinitialize a handset) that may be introduced into SyncML may apply only to the client-side, with SyncML core (or engines) on the server-sides configured to ignore such commands. In addition, any requests to update firmware may be restricted to the client-side.

Recent versions of SyncML DM do not have commands exclusively aimed at one side or the other, i.e. a command that is restricted to the client-side alone or the server-side alone. The SyncML DM management client may be a combination of a Download Agent with a security service and a resource manager that manages a tree of managed objects.

SyncML DM does not yet provide Update Agent (an agent for applying firmware updates in an electronic device) capabilities; it provides support for executing commands on the client-side. Such commands may include commands to Add, Copy, Delete, Exec, Get, Sequence, etc. that may be used to manipulate managed objects. Therefore, management objects may be added, copied, deleted, replaced, etc.

The SyncML management client may process XML, execute commands and transfer data. A SyncML DM client may comprise an XML parser that may employ SyncML DM elements and commands; an "engine" that may execute commands based on data retrieved from SyncML (XML) content; a tree or registry of management objects that may be targets of commands executed by the engine; and a data transport layer that may be based on one of Hyper Text Transfer Protocol (HTTP), Object Exchange (OBEX), Wireless Session Protocol (WSP), etc.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system employing Synchronization Markup Language (SyncML) device management specifications to facilitate firmware updates in an electronic device. The system comprises at least one electronic device having a memory, at least a portion of the memory comprising non-volatile memory containing firmware; a SyncML server communicatively coupled to the electronic device, the server comprising an enhanced SyncML DM server software; and a SyncML DM client resident in the electronic device, wherein the SyncML DM client is capable of interpreting enhancements to the SyncML DM specifications for updating the firmware.

The electronic device comprises communication software that supports at least one data transport protocol; a security module; and at least one software function that provides access to proprietary parameters in the electronic device.

The SyncML DM client comprises message processing software that facilitates processing and executing of SyncML messages, commands, alerts, and notifications; a SyncML manager; a download software that facilitates the downloading of at least one firmware update package from the SyncML server; and an update software that facilitates the updating of firmware using the at least one firmware update package.

The method for updating firmware in the electronic device in the system employing enhancements to SyncML DM specifications comprises sending a SyncML based notification to the electronic device; facilitating communication between the electronic device and the SyncML server; receiving the notification by a SyncML DM client resident in the electronic device; parsing the notification; and sending the notification for user review and subsequent user input. The method further comprises initiating a firmware update based on an input by the user; sending the firmware update to a download agent in the electronic device; communicating an appropriate SyncML message to initiate download of an update package from the SyncML server; facilitating and analyzing a response from the SyncML server; verifying validity and authentication of the update package, if an update package is received as part of the response; and dispatching commands in the response to appropriate modules.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
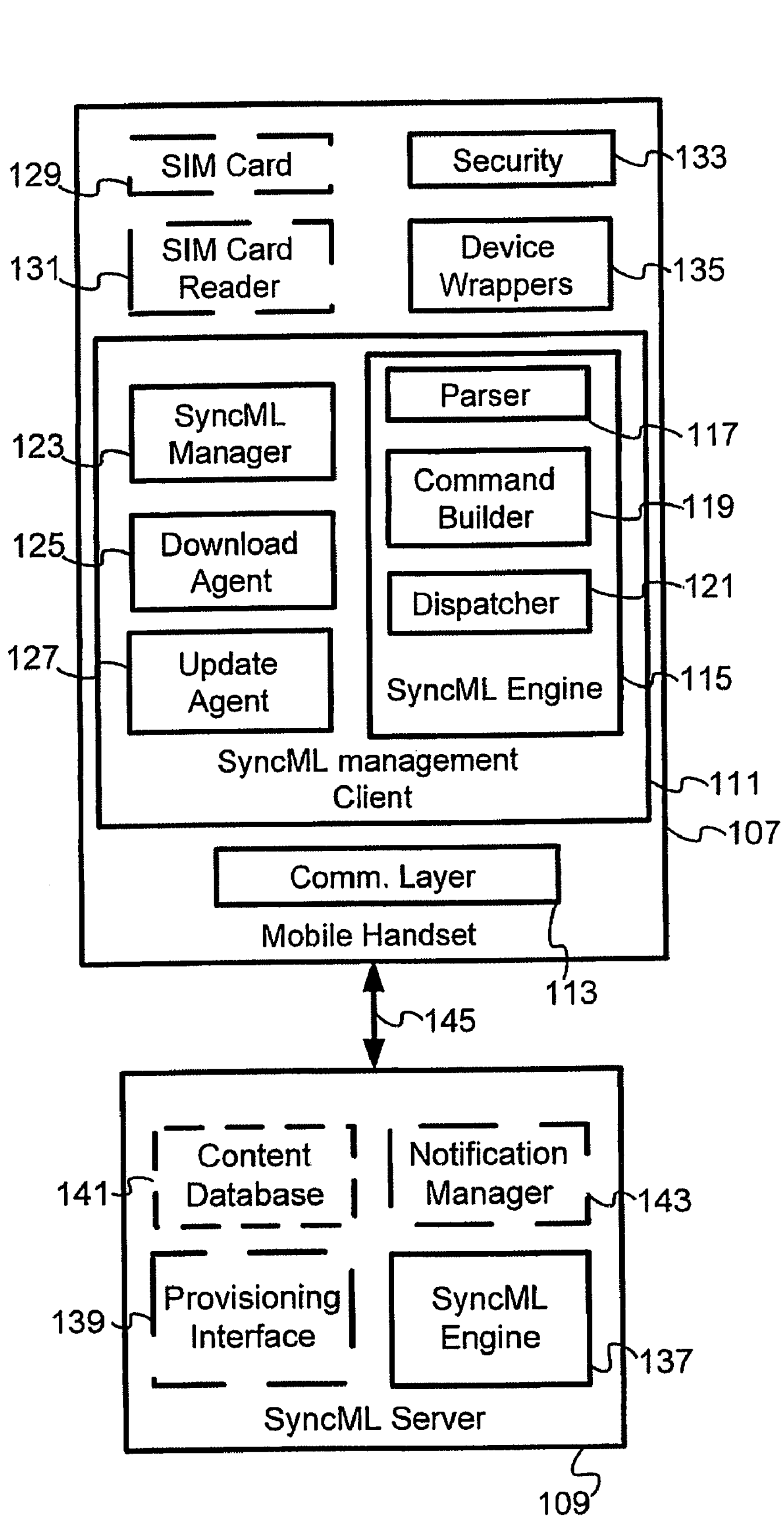
FIG. 1 illustrates a block diagram of an exemplary system with SyncML DM environment, in accordance with an embodiment of the present invention.

FIG. 1 illustrates a block diagram of an exemplary system 105 with SyncML DM environment, in accordance with an embodiment of the present invention. The system 105 comprises a mobile handset 107 and a SyncML server 109. The mobile handset 107 and the SyncML server 109 may be connected via a communications link 145. The system 105 may employ enhancements to SyncML DM specifications to facilitate firmware updates on the mobile handset 107. The mobile handset 107 may comprise a SyncML management client 111, and a communication layer 113 that may provide one or more data transport protocols. In addition, the mobile handset 107 may comprise a security module 133, and device wrappers 135 that may provide access to configuration parameters, hardware elements, memory elements and User Interface (UI) modules. In an embodiment of the present invention, the mobile handset 107 may also comprise a SIM card reader 131 and a SIM card 129.

The SyncML server 109 may comprise a SyncML engine 137. In an embodiment of the present invention, the SyncML server 109 may also comprise a provisioning interface 139, which may provide an interface to one or more external service provisioning systems, a content database 141, which may provide access to content such as firmware update packages, and a notification manager 143, which may provide notification support to facilitate notification of mobile handset 107. The SyncML engine 137 may facilitate the creation and communication of SyncML based messages, notifications, update packages, etc. to the mobile handset 107. The SyncML engine 137 may also support parsing and execution of SyncML requests including the enhancements to SyncML DM introduced by the present invention.

The SyncML management client 111 may comprise a SyncML engine 115, a SyncML manager 123, a download agent 125 and an update agent 127.

The SyncML engine 115 may facilitate the processing and execution of SyncML messages, commands, alerts, notifications, etc. The SyncML engine 115 may comprise a parser 117 that may be used to parse incoming SyncML messages to retrieve commands and data, a command builder 119 that may be used to assemble SyncML messages, requests, notifications, alerts, etc., and a dispatcher 121 that may dispatch commands received in SyncML based messages, alerts, etc. for execution by the SyncML management client 111 or other modules or applications in the mobile handset 107.

The SyncML manager 123 may provide support for managing the life-cycle of management objects, managing SyncML command execution, facilitating user interactions, etc. The download agent 125 may facilitate the download of update packages for software/firmware from the SyncML server 109 employing one or more data transport protocols supported by the communication layer 113. The update agent 127 may facilitate the update of the firmware/software of the mobile handset by employing one or more downloaded update packages.

In an embodiment of the present invention, the SyncML server 109 may send a SyncML-based notification, to the mobile handset 107, employing an external notification manager 143. The notification may indicate the availability of a firmware update package. The communication layer 113 may facilitate the communication between the mobile handset 107 and the SyncML server 109. The SyncML management client 111 may receive the notification message from the SyncML server 109. The SyncML management client 111 may employ the parser 117 in the SyncML engine 115 to parse the received SyncML message. The dispatcher 121 may dispatch the notification for user review and subsequent user input, employing device wrappers 135. The device wrappers 135 may be functions utilized to indirectly access proprietary information or code stored in hardware device (e.g., registers).

The dispatcher 121 may dispatch subsequent user-initiated update of firmware to the download agent 125. The download agent 125 may communicate an appropriate SyncML message assembled by the command builder 119, to initiate download of an update package from the SyncML server 109. The download agent 125 may also facilitate the download of a response from the SyncML server 109, the response subsequently being parsed by the parser 117 and analyzed by the SyncML manager 123 and the SyncML engine 115. If an update package is received from the SyncML server 109 as part of the response, the SyncML manager 123 may ensure validity and authentication of the update package, by employing the security module 133 and the device wrappers 135. The dispatcher 121 may dispatch the commands in the SyncML-based response to appropriate modules via device wrappers 135 or via the SyncML manager 123. The commands may comprise commands such as, for example, a command for the verification of a received update package, a command for saving the update package in an appropriate management object, a command for initiating an update process by the update agent 127 and a command for subsequent notification of the result of update agent processing (success, failure, etc.).

In an embodiment of the present invention, the SyncML management client 111 may employ new commands for retrieving update packages for firmware updates and for updating the firmware based on appropriateness, security and authentication, employing fault tolerant update mechanism. The SyncML engine 137 in the SyncML server109 may be capable of processing the new enhancement commands sent to it by the mobile handset 107.

The update packages may be accompanied by a header that contains, among other entries, a cyclic redundancy check (CRC) value employed in the verification of the authenticity of the received update packages. The verification of received update packages may involve computing CRC values and comparing them to reference CRC values provided in a header that accompanies the update packages. Other forms of verification and authentication based on specific entries in the header are also contemplated.

In an embodiment of the present invention, a command to communicate the change of SIM card 129 detected by the mobile handset 107 may be supported by the mobile handset 107. The SyncML engine 137 in the SyncML server 109 may be capable of processing such a command and acting upon it.

In an embodiment of the present invention, a client-side device such as, for example, a mobile handset 107, may incorporate a management client 111 that may comprise an update agent 127, a download agent 125 (simplified to ride on top of/employ one or more data transport protocols), a SyncML engine 115, and a SyncML manager 123. The SyncML engine 115 may comprise a SyncML dispatcher 121, a SyncML parser 117, and a SyncML command builder 119.

In an embodiment of the present invention, a communication layer 113 may be utilized for the download agent 125 to interact with a management server such as, for example, the SyncML server 109. The communication layer 113 may support such function as, for example, protocolInitialization, openConnection( ), closeConnection( ), sendData( ), and receiveData( ), on which the download agent may depend.

In an embodiment of the present invention a security layer may be utilized. The security layer may be considered to be external to the management client.

Aspects of the present invention retain differentiation in the creation of the update package and the process of applying the update fault tolerantly, as allowed by the SyncML standard. An embodiment of the present invention may utilize a newly defined, extensible, XML-based Agent-to-Server meta-data protocol that adapts more easily to the SyncML DM "software download" standard, when it is ratified. A package query protocol associated with an embodiment of the present invention may follow the same extensibility and meta-data management principles seen in current SyncML standards. As a result, various embodiments of the present invention may easily comply with the SyncML standard.

SyncML DM provides a management client that is responsible for providing access to management objects. The management objects may be arranged in a management tree. The management client may be capable of manipulating the management objects and the management tree. In addition, a management tree may be comprised of management objects where each management object is a unit of code/data/application that may be accessed and/or manipulated.

The management client proposed by the SyncML standards is responsible for client-side support for SyncML based communications with management servers. Some of the duties associated with the management clients, include, for example, processing SyncML data, parsing, dispatching, and command building. A management client in an embodiment of the present invention may support dispatching and/or executing of SyncML DM commands such as, for example, alert, replace, status, add, copy, delete, exec, get, sequence, etc. The management client may also interact with a management server employing SyncML commands and structure using a communication toolkit. In addition, the management client proposed by the SyncML standards may support session initiation and termination.

The Alert command may be used to convey notifications, such as device management session requests, to the recipient. Such device management session requests may be client initiated or server initiated. In addition, wireless applications protocol(WAP) push-based notification may be a required feature in SyncML DM servers and clients, in an embodiment of the present invention.

SyncML DM clients may have to support security features such as hash message authentication code (HMAC), including basic authentication, challenge/responses, etc.

In an embodiment of the present invention, on the server-side, a device server may have its own SyncML engine to process user requests as well as to provide requested data to the mobile handsets in SyncML format. The device server may also be responsible for implementing the required security services, inserting security challenges in SyncML communications if necessary.

In an embodiment of the present invention, to be SyncML-compliant, an engine that executes SyncML DM commands may be provided. A tree of management objects may be created and maintained by the management client.

An embodiment of the present invention may comprise a SyncML management client. As a result, in addition to the download agent and the update agent, an embodiment of the present invention may employ XML parsers, encryption libraries, etc. in a mobile handset in order to assemble XML data/requests to be sent as SyncML DM commands/Alerts/Requests, parse any received XML data if data is returned as XML by the management server, and incorporate security mechanisms that may be used (Message Digest 5 (MD5), HMAC, etc.).

An embodiment of the present invention may enhance its set of device wrapper functions to be able to retrieve all the XML elements sent to the management server. The management client in such an embodiment may comprise its own download agent.

In accordance with the present invention, mobile handsets, which provide support for XML, may be multi-threaded. In a multi-threaded environment, it may not be appropriate to assume that an update process can immediately follow a download of an update package, because other applications may be running concurrently. As a result, an embodiment of the present invention may provide separate download and update processes.

An embodiment of the present invention may support reboot commands, reset commands, and power cycling by providing a location for storing downloaded update packages. An embodiment of the present invention may provide such a location by specifying a managed object for firmware updates.

An embodiment of the present invention may also provide an update package in a firmware updating service that comes up automatically during a power cycle/reboot. A SyncML DM command set enhancement that initiates a power cycling/reboot may be provided in an embodiment of the present invention. Another command enhancement may store a downloaded firmware update into an associated managed object. Yet another command enhancement may verify the authenticity of the firmware update package based on configurations and user profiles.

An embodiment of the present invention may utilize enhancement commands such as, for example, GetFirmwareUpdate, VerifyFirmwareUpdate, SaveFirmwareUpdate, ApplyFirmwareUpdate, ConfirmFirmwareUpdate, and SIMCardChange, explained below. An embodiment of the present invention may add these enhancement commands to the set of SyncML DM Protocol Command Elements as enhancements.

In an embodiment of the present invention, the SyncML DM protocol allows the enhancement commands to be executed on nodes of the management tree in the mobile device 107. The SyncML device management may be the means by which the management tree is manipulated by the SyncML DM server. In an embodiment of the present invention, each node is addressed by a unique uniform resource identifier (URI). In SyncML DM protocol, the target and source of a command are identified by the target and source elements.

In an embodiment of the present invention, the SyncML management server may employ the exec command to invoke the enhancement commands associated with the firmware updates in the mobile handset. The exec command may launch a process that initiates the firmware update download in accordance with the parameters provided in the exec command. The implementation of the exec command may ensure that the entire firmware update file download is completed prior to starting any code rewrites on the device.

The command GetFirmwareUpdate may create a new management object that refers to an update package of the firmware. This command may specify an item element to be retrieved; the item element may be also specified with an associated target element. The firmware update retrieved may be saved as a management object.

The GetFirmwareUpdate command, in an embodiment of the present invention, may verify whether an update package already exists in the mobile handset before initiating a new download, in order to avoid an unnecessary download.

In an embodiment of the present invention, the GetFirmwareUpdate command may provide the functionality of the SyncML DM GET command, in addition to providing the support to verify whether the retrieval is necessary before conducting it.

In an embodiment of the present invention, the SyncML DM server may employ the GetFirmwareUpdate command to download the firmware update package from a given location such as a uniform resource locator (URL). The GetFirmwareUpdate command may be executed by the SyncML DM protocol using the exemplary XML code shown below:

```
<GetFirmwareUpdate>
    <CmdID>3</CmdID>
    <Item>
        <Target>
            <LocURI> 'Managed Object where update package stored is specified
            here' </LocURI>
        </Target>
        <Source>
            <LocURI>'URL of update package is specified here' </LocURI>
        </Source>
        <Data>DL__URL=AnyURL</Data>
        <Data>DL__Prompt=[0|1]</Data> <!-- 0 is no prompting, 1 is with prompting -->
    </Item>
</GetFirmwareUpdate>
```

The Target element of the GetFirmwareUpdate command specifies where in the management tree the downloaded update package gets inserted. The Data element DL__URL specifies the source URL for the download of the firmware update package. In an embodiment of the present invention, the command may be executed with a user prompt, in which case an appropriate value is employed in the Data element for DL__Prompt value. Other Data and/or Target elements may be also used.

In an embodiment of the present invention, other forms of download of the firmware update package may be utilized. For example, the following Download command, which may be a generic form of the GetFirmwareUpdate command, may be used with firmware as well as software and other forms of generic downloads:

```
<Download>
    <CmdID>3</CmdID>
    <Item>
        <Target>
            <LocURI> 'URI of a node for the storage of update package is
        specified here, or a node that represents the target of the update' </LocURI>
        <Target>
        <Source>
            <LocURI> 'URL of update package is specified here' </LocURI>
        </Source>
        <Data>DL__URL=AnyURL</Data>
        <Data>DL__Prompt=[0|1]</Data> <!-- 0 is no prompting, 1 is with prompting -->
    </Item>
</Download>
```

An embodiment of the present invention may support a VerifyFirmwareUpdate command to verify the authenticity and appropriateness of a downloaded firmware update. Appropriate results/errors may be communicated to the SyncML management client when appropriate. The VerifyFirmwareUpdate command may be executed by the SyncML DM protocol using the exemplary XML code shown below:

```
<VerifyFirmwareUpdate>
    <CmdID>3</CmdID>
    <Item>
```

-continued

```
        <Target>
            <LocURI>./FWUpdate/x/PkgStatus</LocURI>
        </Target>
        <Source>
            <LocURI>./FWUpdate/x/PkgURL</LocURI>
        </Source>
    </Item>
</VerifyFirmwareUpdate>
```

The VerifyFirmwareUpdate command may verify the specified update package. The update package may be specified using the Source element, and the result of such verification may be populated into a Target URI. Other Target and/or Source elements may also be used.

An embodiment of the present invention may support a SaveFirmwareUpdate command to save the firmware update in an appropriate management object and/or FLASH segments in memory. The SaveFirmwareUpdate command, in an embodiment of the present invention, may provide support for the functionality of the SyncML DM Replace or Add commands. The SaveFirnwareUpdate command may be used to ensure that an update agent sets an "update" bit in FLASH for a subsequent update process. The SaveFirmwareUpdate command may be executed by the SyncML DM protocol using the exemplary XML code shown below:

```
<SaveFirmwareUpdate>
    <CmdID>3</CmdID>
    <Item>
        <Source>
            <LocURI>./FWUpdate/x/PkgData</LocURI>
        </Source>
        <Data>Address=0×00089F</Data> <!—Address specified as hex value-->
    </Item>
</SaveFirmwareUpdate>
```

The SaveFirmwareUpdate command facilitates saving of the update package in specific address locations that may be implementation-dependent. In the above example, binary data from the management tree located in the mobile handset at the location ./FWUpdate/x/PkgData is saved at the address specified in the Data element for ‘Address’ parameter. Other Source and/or Data elements may also be used.

An embodiment of the present invention may support an ApplyFirmwareUpdate command to take a target firmware update management object and launch an update process. The update process may involve power cycling the mobile handset. The result of taking a target firmware update management object and launching an update process may be communicated only after the power cycling step has been executed. The ApplyFirmwareUpdate command may be executed by the SyncML DM protocol using the exemplary XML code shown below:

```
<ApplyFirmwareUpdate>
    <CmdID>3</CmdID>
    <Item>
        <Source>
            <LocURI>./FwUpdate/x/PkgURL</LocURI>
        </Source>
        <Data>argument1</Data>
        <Data>argument2</Data>
        <Data>argument3</Data>
    </Item>
</ApplyFirmwareUpdate>
```

The ApplyFirmwareUpdate command facilitates the invocation of an update agent. The ApplyFirmwareUpdate command specifies the Source element as a URI in the management tree, and specifies optional prompts. Other Source and/or Data elements may also be used.

In an embodiment of the present invention, other Update commands may be utilized for updating firmware with a firmware update package. For example, the following Update command, which may be a generic form of the ApplyFirmwareUpdate command, may be used:

```
<Update>
    <CmdID>3</CmdID>
    <Item>
        <Target>
            <LocURI>./.../Application/ ApplicationXXX</LocURI>
        </Target>
        <Source>
            <LocURI>./FwUpdate/x/PkgURL</LocURI>
        </Source>
        <Data>argument1</Data>
        <Data>argument2</Data>
        <Data>argument3</Data>
    </Item>
</Update>
```

In the Update command, Target specifies the node in the management tree that represents the Application or component to be updated. The Source specifies the URL from which the update package(s) are to be downloaded or retrieved. A node that provides an update package that may have been previously downloaded, or may be part of the management tree, may also be employed.

An embodiment of the present invention may support a ConfirmFirmwareUpdate command to confirm the status of the previously executed firmware update event. The ability to confirm successful completion of a firmware update may be used to initiate billing activities on the carrier-side. The ConfirmFirmwareUpdate command, in an embodiment of the present invention, may support the functionality of a SyncML DM generic update confirmation command/notification, which may be utilized to indicate a successful completion of update events, specifically to initiate possible billing activities.

When a SIM card changes on the mobile handset side, the nature of the service may change on the carrier-side. An embodiment of the present invention may support a SIMCardChange command to facilitate the notification of service-level changes with possible changes to billing events.

Figure 2:
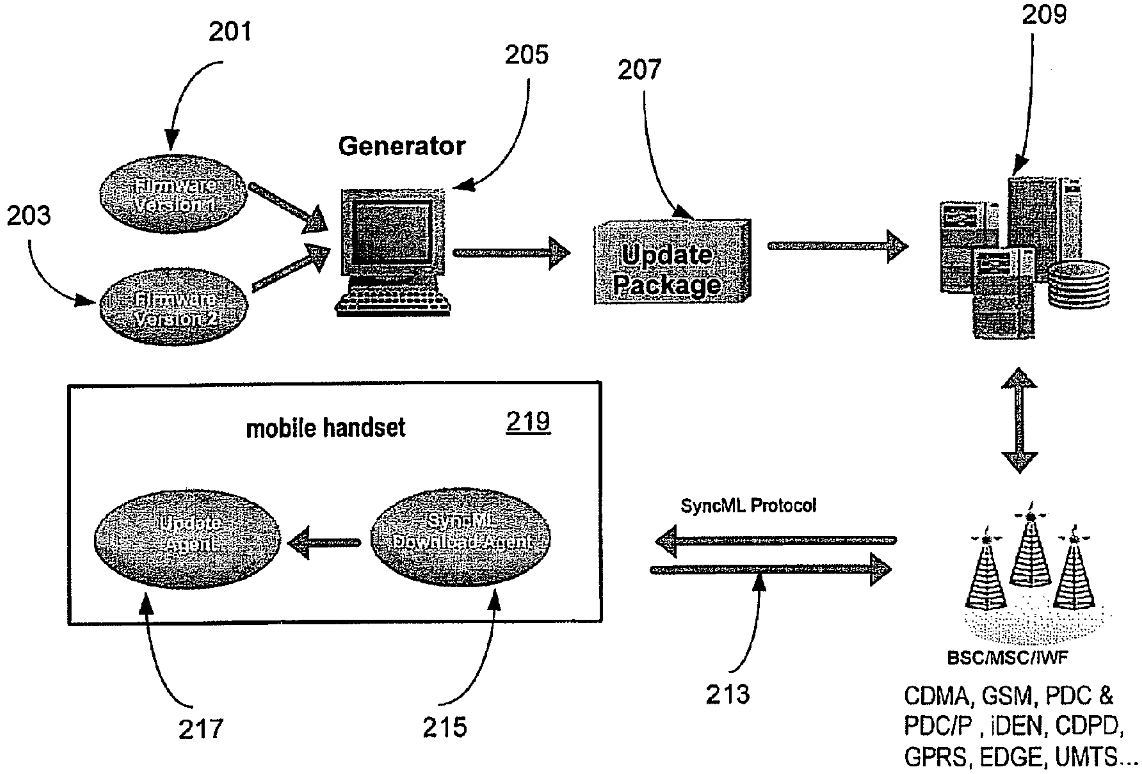
FIG. 2 illustrates an exemplary end-to-end architecture, in accordance with an embodiment of the present invention.

FIG. 2 illustrates an exemplary end-to-end architecture, in accordance with an embodiment of the present invention. The solution depicted in FIG. 2 is compliant with SyncML specifications.

A mobile handset 219 may comprise firmware. The mobile handset 219 may be communicatively coupled with a SyncML DM server 209 via a communication link 213. The communication link between the SyncML DM server 209 and the mobile handset 219 may utilize a SyncML protocol 213. The SyncML DM server 209 may receive a firmware update package 207 from the generator 205 that generated the update package 207 utilizing an old (original) version of the firmware 201 and a new (target) version of the firmware 203.

In an embodiment of the present invention, the SyncML DM server 209 may be used to store the update packages 207, to manage delivery of the update packages 207, and to maintain system security. The enhancement commands described hereinabove enable an enhanced SyncML DM server 209 to provide the firmware updating service, which is not supported by the commands available using a server compliant only with the existing SyncML DM standards.

In an embodiment of the present invention, the mobile handset 219 may comprise a SyncML DM download agent 215, and an update agent 217. The SyncML DM download agent 215 may be responsible for initializing, transferring, and checking the update package 207 sent by the SyncML DM server 209. The update agent 217 may then apply the updates to the firmware in a fault tolerant manner in accordance with an embodiment of the present invention.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system employing Synchronization Markup Language (SyncML) device management specifications, recorded in memory and capable of being processed by an electronic device, to facilitate firmware updates in the electronic device, the system comprising:

at least one electronic device having a memory, at least a portion of the memory comprising non-volatile memory containing firmware;

a SyncML server communicatively coupled to the electronic device, the server comprising an enhanced SyncML DM server software; and a SyncML DM client resident in the electronic device, wherein the SyncML DM client is capable of interpreting enhancements to the SyncML DM specifications for updating the firmware.

2. The system according to claim 1 wherein the electronic device comprises:

communication software that supports at least one data transport protocol;

a security module; and at least one software function that provides access to proprietary parameters in the electronic device.

3. The system according to claim 2 wherein the electronic device further comprises a security device.

4. The system according to claim 2 wherein the electronic device further comprises a security device reader.

5. The system according to claim 2 wherein the SyncML DM client comprises:

message processing software that facilitates processing and executing of SyncML messages, commands, alerts, and notifications;

a SyncML manager;

a download software that facilitates the downloading of at least one firmware update package from the SyncML server; and an update software that facilitates the updating of firmware using the at least one firmware update package.

6. The system according to claim 5 wherein the message processing software comprises:

a first software that parses SyncML messages to retrieve data;

a second software that assembles SyncML messages; and a third software that sends the data retrieved from the SyncML messages for execution.

7. The system according to claim 1 wherein the SyncML server comprises a SyncML engine.

8. The system according to claim 7 wherein the SyncML server further comprises an interface to at least one external service provisioning system.

9. The system according to claim 7 wherein the SyncML server further comprises a manager that facilitates notification of the electronic device.

10. The system according to claim 7 wherein the SyncML engine facilitates the creation and communication of SyncML messages and notifications to the electronic device.

11. The system according to claim 7 wherein the SyncML engine facilitates the creation and communication of update packages to the electronic device.

12. The system according to claim 7 wherein the SyncML engine supports parsing and executing at least one enhancement of SyncML requests such as the enhancements to SyncML device management specifications.

13. The system according to claim 7 wherein the SyncML server further comprises a database that provides access to copies of the firmware in the electronic device.

14. The system according to claim 13 wherein the content is firmware update packages.

15. A method for updating firmware in an electronic device in a system employing enhancements to SyncML DM specifications, recorded in memory and capable of being processed by an electronic device, the system comprising the electronic device and a SyncML server, the method comprising:

receiving, by a SyncML DM client resident in the electronic device, a SyncML based notification from the SyncML server;

parsing the notification; and sending the notification for user review and subsequent user input.

16. The method according to claim 15 wherein the notification indicates availability of a firmware update package.

17. The method according to claim 15 wherein the method further comprises:

initiating a firmware update based on an input by the user;

sending the firmware update to a download agent in the electronic device;

communicating an appropriate SyncML message to initiate download of an update package from the SyncML server; and facilitating and analyzing a response from the SyncML server.

18. The method according to claim 17 further comprising:

verifying validity and authentication of the update package, if an update package is received as part of the response; and dispatching commands in the response to appropriate modules.

19. The method according to claim 18 wherein the commands comprise a command for verification of the received update package.

20. The method according to claim 18 wherein the commands comprise a command for saving the update package in an appropriate management object.

21. The method according to claim 18 wherein the commands comprise a command for retrieving update packages.

22. The method according to claim 18 wherein the commands comprise a command for updating the firmware based on appropriateness, security, and authentication.

23. The method according to claim 18 wherein the commands comprise a command for initiating an update process by the update agent.

24. The method according to claim 23 wherein the commands comprise a command for subsequent notification of the result of the update agent processing.

25. The method according to claim 17 wherein the SyncML message is assembled in the electronic device.

26. A mobile electronic device comprising: machine-readable storage containing SyncML DM interpreter code executable by the mobile electronic device; and Wherein the SyncML DM interpreter code supports updates and downloads of software and firmware in the mobile electronic device.

* * * * *